(12) United States Patent
Rutkowski et al.

(10) Patent No.: US 11,908,311 B2
(45) Date of Patent: Feb. 20, 2024

(54) HAPTICS AUDIBLE NOISE REDUCTION

(71) Applicant: QUALCOMM Incorporated, San Diego, CA (US)

(72) Inventors: Joseph Dale Rutkowski, Chandler, AZ (US); Liangguo Shen, San Diego, CA (US); Shivaprakash Halagur, Singapore (SG); Joshua Zazzera, Chandler, AZ (US); Nathaniel Jay T. Salazar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/654,030

(22) Filed: Mar. 8, 2022

(65) Prior Publication Data

US 2023/0292042 A1 Sep. 14, 2023

(51) Int. Cl.
*G08B 6/00* (2006.01)

(52) U.S. Cl.
CPC .................... *G08B 6/00* (2013.01)

(58) Field of Classification Search
USPC .... 340/407.1, 407.2, 7.32, 815.49, 662–663, 340/683, 310.15, 310.13, 310.12, 310.14, 340/7.6, 658, 636.1
See application file for complete search history.

(56) References Cited

U.S. PATENT DOCUMENTS

| | | | | |
|---|---|---|---|---|
| 7,952,483 B2* | 5/2011 | Ferguson | ............. | A61B 5/1126 345/161 |
| 9,608,848 B2* | 3/2017 | Roy | .......................... | H04B 1/04 |
| 10,020,059 B1* | 7/2018 | Balaga | .................... | G11C 16/24 |
| 2012/0229264 A1 | 9/2012 | Company Bosch et al. | | |
| 2019/0304267 A1* | 10/2019 | Kanai | .................... | H02P 25/032 |
| 2020/0201292 A1* | 6/2020 | Cella | .................. | G05B 23/0259 |
| 2021/0319677 A1* | 10/2021 | Wang | .................... | H02P 25/032 |
| 2021/0325967 A1* | 10/2021 | Khenkin | ............... | B06B 1/0261 |
| 2021/0339127 A1* | 11/2021 | Ito | ............................. | G06F 8/38 |

FOREIGN PATENT DOCUMENTS

WO    2022047438    3/2022

OTHER PUBLICATIONS

Dementyev A., et al., "Haptics with Input: Back-EMF in Linear Resonant Actuators to Enable Touch, Pressure and Environmental Awareness", Proceedings of The 33rd Annual ACM Symposium on User Interface Software and Technology, ACMPUB27, New York, NY, USA, Oct. 20, 2020, XP058726772, pp. 420-429, p. 422-p. 423, figures 4, 5 abstract, figure 1.
International Search Report and Written Opinion—PCT/US2023/060154—ISA/EPO—dated Apr. 11, 2023.

* cited by examiner

*Primary Examiner* — Daniel Previl
(74) *Attorney, Agent, or Firm* — QUALCOMM Incorporated

(57) ABSTRACT

Innovative techniques to design and generate haptics waveforms are proposed. The proposed techniques reduce or eliminate audible noises being generated by a haptic actuator during operation. A haptic controller may compose a voltage waveform at a resonant frequency of the haptic actuator and generate a corresponding control signal. Instead of suddenly entering a high impedance state from a driving state, the voltage waveform may include a ramp down portion in which the voltage ramps down continuously but quickly so that the current flowing within the actuator is brought down before entering the high impedance state. In this way, audible noises may be reduced or even eliminated.

30 Claims, 10 Drawing Sheets

HAPTICS AUDIBLE NOISE REDUCTION

FIELD OF DISCLOSURE

This disclosure relates generally to systems, apparatuses and methods for driving haptic actuators, and in particular to systems, apparatuses and methods driving a haptic actuator (e.g., linear resonant actuators (LRA)) such that audible noises from the haptic actuator is reduced or even eliminated altogether.

BACKGROUND

Haptic (vibration pattern) experience on platforms—e.g., mobile devices such as smart phones—is being enhanced day by day. In a perspective, haptics may be viewed as stimulation of the senses of touch and motion, e.g., by reproducing sensations when interacting with physical objects. When providing haptic feedback, i.e., when the haptic actuator (such as LRA) is operating, unintended audible noise from haptic actuator can detract from the user experience.

Accordingly, there is a need for systems, apparatus, and methods that overcome the deficiencies of conventional haptics actuators including the methods, system and apparatus provided herein.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An exemplary device is disclosed. The device may comprise a haptic controller configured to compose a voltage waveform at a resonant frequency of a haptic actuator, and configured to generate a control signal corresponding to the voltage waveform. The voltage waveform may comprise at least one half cycle divided into a drive portion, a ramp down portion, and a high impedance (high Z) portion. During the drive portion, the voltage waveform may be a wave at the resonant frequency. A voltage of the voltage waveform at an end of the drive portion may be an end drive voltage. During the ramp down portion, the voltage of the voltage waveform may change from the end drive voltage to an end ramp down voltage. A magnitude of the end drive voltage (end drive voltage magnitude) may be greater than a magnitude of the end ramp down voltage (end ramp down voltage magnitude). A mag(dv/dt) at the end of the drive portion may be less than the mag(dv/dt) at a beginning of the ramp down portion. The mag(dv/dt) may represent a magnitude of change in the voltage of the voltage waveform over time. The device may also comprise a haptic driver configured to drive the haptic actuator with the voltage waveform based on the control signal. The haptic driver may also be configured to be disabled during the high Z portion.

An exemplary method is disclosed. The method may comprise composing a voltage waveform at a resonant frequency of a haptic actuator. The voltage waveform may comprise at least one-half cycle divided into a drive portion, a ramp down portion, and a high impedance (high Z) portion. During the drive portion, the voltage waveform may be a wave at the resonant frequency. A voltage of the voltage waveform at an end of the drive portion may be an end drive voltage. During the ramp down portion, the voltage of the voltage waveform may change from the end drive voltage to an end ramp down voltage. A magnitude of the end drive voltage (end drive voltage magnitude) may be greater than a magnitude of the end ramp down voltage (end ramp down voltage magnitude). A mag(dv/dt) at the end of the drive portion may be less than the mag(dv/dt) at a beginning of the ramp down portion. The mag(dv/dt) may represent a magnitude of change in the voltage of the voltage waveform over time. The method may also comprise generating a control signal corresponding to the voltage waveform. The method may further comprise driving the haptic actuator with the voltage waveform using a haptic driver based on the control signal. During the high Z portion, the haptic driver may be disabled.

An exemplary device is disclosed. The device may comprise means for composing a voltage waveform at a resonant frequency of a haptic actuator. The voltage waveform may comprise at least one-half cycle divided into a drive portion, a ramp down portion, and a high impedance (high Z) portion. During the drive portion, the voltage waveform may be a wave at the resonant frequency. A voltage of the voltage waveform at an end of the drive portion may be an end drive voltage. During the ramp down portion, the voltage of the voltage waveform may change from the end drive voltage to an end ramp down voltage. A magnitude of the end drive voltage (end drive voltage magnitude) may be greater than a magnitude of the end ramp down voltage (end ramp down voltage magnitude). A mag(dv/dt) at the end of the drive portion may be less than the mag(dv/dt) at a beginning of the ramp down portion. The mag(dv/dt) may represent a magnitude of change in the voltage of the voltage waveform over time. The device may also comprise means for generating a control signal corresponding to the voltage waveform. The device may further comprise means for driving the haptic actuator with the voltage waveform based on the control signal. During the high Z portion, the means for driving may be disabled.

An exemplary non-transitory computer-readable medium storing computer-executable instructions for a device is disclosed. The computer-executable instructions may comprise one or more instructions to instruct the device to compose a voltage waveform at a resonant frequency of a haptic actuator. The voltage waveform may comprise at least one-half cycle divided into a drive portion, a ramp down portion, and a high impedance (high Z) portion. During the drive portion, the voltage waveform may be a wave at the resonant frequency. A voltage of the voltage waveform at an end of the drive portion may be an end drive voltage. During the ramp down portion, the voltage of the voltage waveform may change from the end drive voltage to an end ramp down voltage. A magnitude of the end drive voltage (end drive voltage magnitude) may be greater than a magnitude of the end ramp down voltage (end ramp down voltage magnitude). A mag(dv/dt) at the end of the drive portion may be less than the mag(dv/dt) at a beginning of the ramp down portion. The mag(dv/dt) may represent a magnitude of change in the voltage of the voltage waveform over time. The computer-executable instructions may comprise one or more instructions to instruct the device to generate a control signal corresponding to the voltage waveform. The computer-executable instructions may comprise one or more instructions to instruct the device to drive the haptic actuator with the voltage waveform using a haptic driver based on the control signal. During the high Z portion, the haptic driver may be disabled.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1:
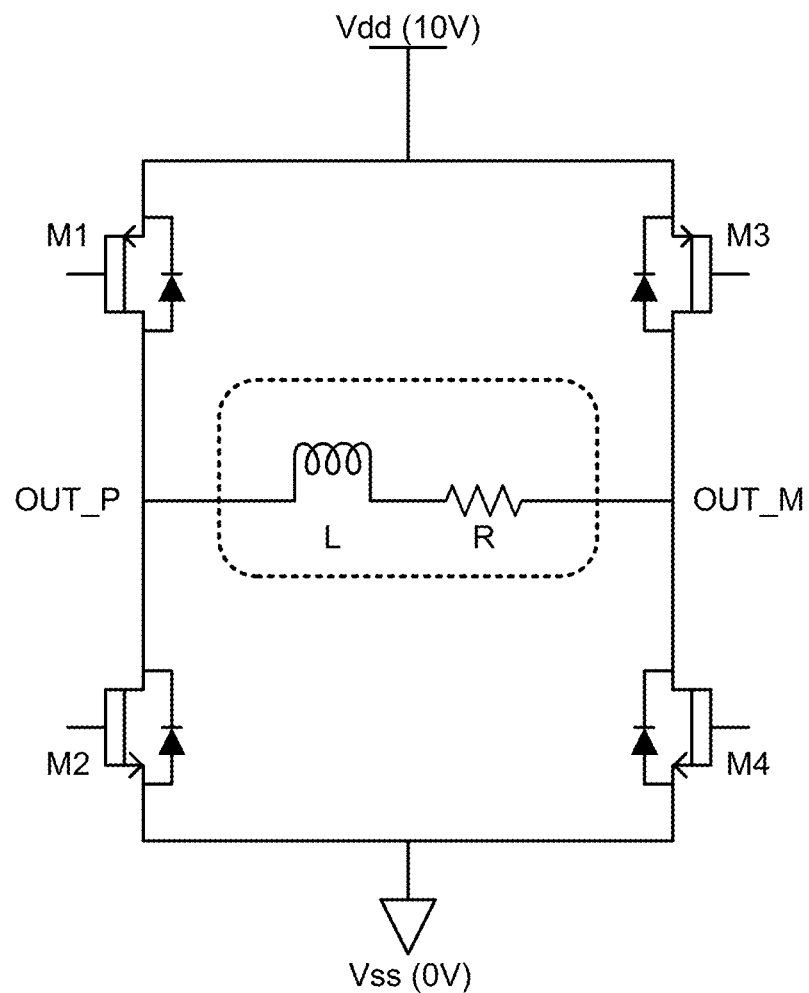
FIG. 1 illustrates a circuit representation of a haptic driver and a linear resonant actuator.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Haptic feedback generations may be used in mobile phones, wearables, virtual reality, gaming, internet of things (IoT), etc. FIG. 1 illustrates a circuit representation of an example haptic driver and an LRA. The haptic driver may include four transistors M1, M2, M3 and M4 connected in an H bridge form. Positive sides of transistors M1 and M3 are connected to a supply voltage Vdd (illustrated as being 10 V) and negative sides of transistors M2 and M4 are connected to Vss (illustrated as being ground or 0 V). The LRA includes a coil (see dashed rectangle) connected across OUT_P and OUT_M nodes of the H bridge. The LRA's coil is modeled as an inductor L in series with a resistor R. An example inductance of the inductor L may range between 150-200 µH, and an example resistance of the resistor R may be about 8Ω.

A sinusoidal voltage waveform can be applied across the coil through pulse width modulation (PWM) of the transistors M1-M4. For descriptive purposes, polarity of the voltage across the coil will be considered positive when OUT_P is at a higher voltage than OUT_M, and negative when OUT_P is at a lower voltage than OUT_M. Transistors are modulated in pairs in which M1 and M4 make up the first pair and M2 and M3 make up the second pair. The modulation is such that at most one pair of transistors are on at a given time. When the first pair of transistors (M1, M4) are on, the voltage polarity between OUT_P and OUT_M is positive. When the second pair of transistors (M2, M3) are on, the voltage polarity voltage polarity between OUT_P and OUT_M is negative.

It should be noted that voltage polarity here is in terms of average low frequency voltage, i.e., on the order of the resonant frequency of the LRA (e.g., 10 s to 100 s of hertz). PWM typically operates at a very high frequency (e.g., 600 kHZ) relative to the LRA. Instantaneously, there may be occasions where OUT_P<OUT_M from the PWM operation, but nonetheless still have the low frequency waveform (waveform of the LRA) be positive (OUT_P>OUT_M). In short, whether the voltage is considered positive or negative will be from the perspective of the low frequency wave unless specifically indicated otherwise.

As indicated, the PWM takes place at a very fast rate (e.g., 600K per second). This is sufficiently fast so that current flowing within the coil and the voltage across the coil do not instantaneously change with each pulse. Rather, the voltage across the LRA coil and the current flowing therein may represent average voltage and current. Then to generate the positive polarity portion of the sinusoidal waveform (OUT_P voltage greater than OUT_M voltage), the first pair of transistors (M1, M4) are pulse width modulated and the second pair are turned off, i.e., disabled. To generate the negative polarity portion of the sinusoidal waveform (OUT_P voltage less than OUT_M voltage), second pair (M2, M3) are pulse width modulated and the first pair (M1, M4) are turned off.

When positive voltage is applied across the LRA coil, the current flows in one direction (e.g., clockwise) through the coil, which in turn applies a mechanical force to the mass (e.g., permanent magnet) in a direction (e.g., left) within the coil. When negative voltage is applied, the current flows in opposite direction (e.g., counter-clockwise) through the coil, which in turn applies a mechanical force to the mass in an opposite direction (e.g., right). The LRA can be made to vibrate by moving the mass back and forth.

As indicated above, audible noises from the haptic actuator such as the LRA can detract from the user having a good experience. Haptic actuators such as LRAs are high Q systems that exhibit higher acceleration levels when driven at or near their mechanical resonant frequency, e.g., resonant frequency of the mass. Maximum vibration may be achieved by driving the LRA at its resonant frequency.

To achieve high acceleration levels, the LRA is driven in a closed loop feedback at the resonant frequency. Note that the actual resonant frequency of a particular LRA may be different, even slightly, from their specified or expected resonant frequency. Also, the resonant frequency of an LRA may change over time. For example, LRA's spring stiffness may decrease or the magnetic properties of the mass may change as the LRA ages. Further, the resonant frequency may change due to environmental circumstances. For example, increased temperature may also affect the spring stiffness and/or the magnetic properties resulting in a changed resonant frequency.

Thus, it is desirable to determine the actual resonant frequency, which can be done by monitoring the behavior of the LRA as it is being driven. One way of determining the actual resonant frequency of an LRA is through a haptic driver with an auto-resonant frequency drive, which drives the LRA for about 50-90% of the period of the anticipated or expected resonant frequency (e.g., as specified in a spec sheet). The haptic driver is then disabled, i.e., go to high impedance (Z), and a back electromotive force (back EMF, BEMF) is monitored to determine when the BEMF changes polarity, i.e., cross the zero voltage.

Figure 2:
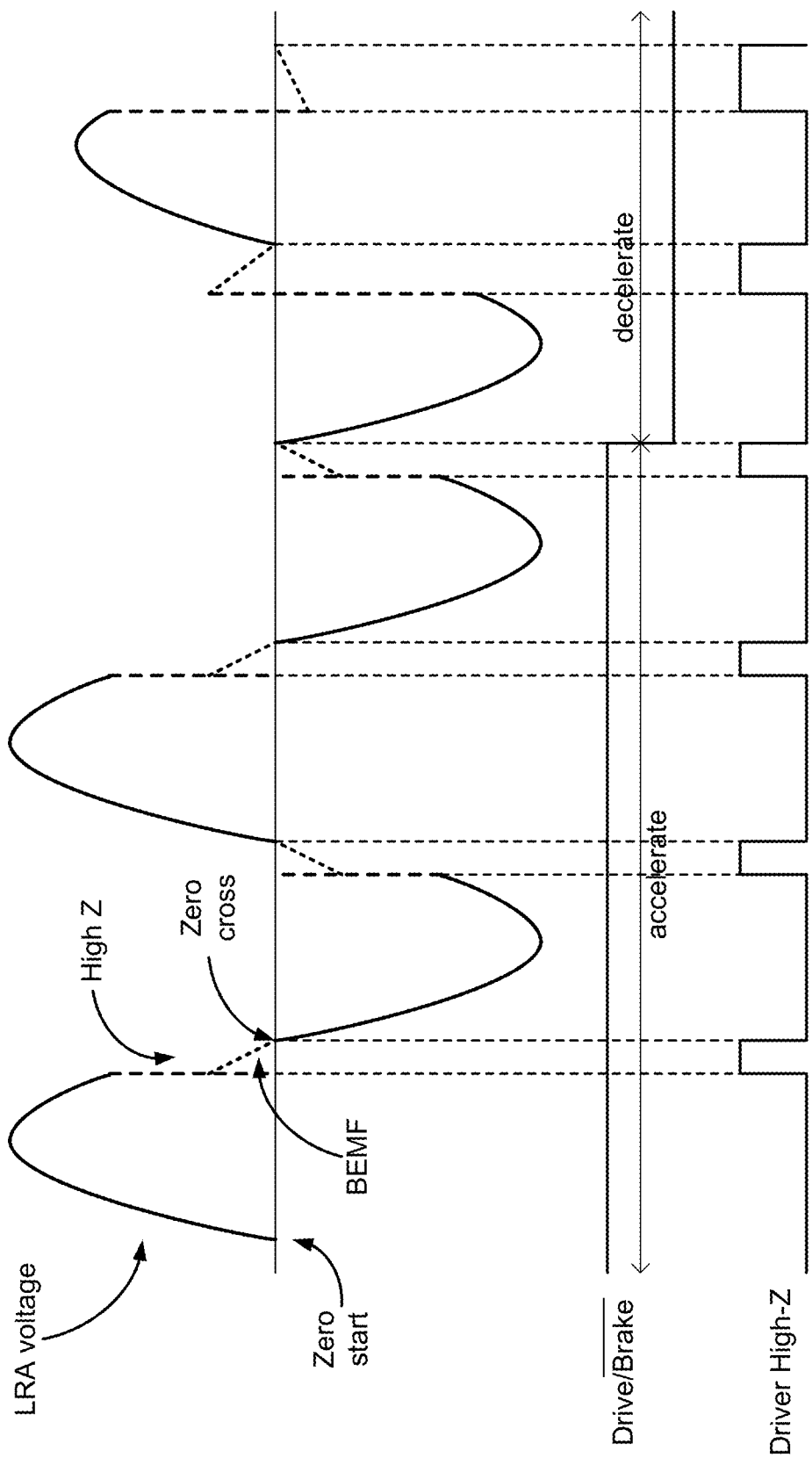
FIG. 2 illustrates an example of a conventional voltage waveform applied across a linear resonant actuator.

This is shown in FIG. 2, which illustrates a voltage waveform formed across an example LRA as it is being driven by a haptics driver. In FIG. 2, the haptic driver applies a voltage across the LRA's coil to accelerate or to decelerate the mass. When accelerating (decelerating), the haptic driver applies voltage so that the resulting current generates a force that enhances (opposes) the current motion of the LRA's mass. For example, assume that a positive voltage across the LRA's coil generates a force to the mass in the left direction and a negative voltage generates a force in the right direction. If the mass is currently moving left, a positive (negative) voltage can be applied to accelerate (decelerate) the mass. If the mass is currently moving right, a negative (positive) voltage can be applied to accelerate (decelerate) the mass.

In FIG. 2, the voltage waveform (represented by solid sinusoidal curves) applied across the LRA is generated by modulating (e.g., PWM) of the transistors M1-M4. The voltage waveform (or voltage curve) above the zero line can be generated by modulating transistors M1, M4 while transistors M2, M3 are disabled. The voltage waveform below the zero line can be generated by modulating transistors M2, M3 while transistors M1, M4 are disabled.

As seen in FIG. 2, the haptic driver can be in one of two modes—drive mode and high impedance (high Z) mode. The haptic driver is in the drive mode for some portion ("drive portion") of a period (e.g., half cycle) of the anticipated or expected resonant frequency and is in the high impedance mode for the remainder ("high Z portion") of the period. During the drive portion, the haptic driver drives or otherwise applies a voltage across the LRA. During the high Z portion, the haptic driver enters a high impedance state.

For example, assume that the expected resonant frequency of an LRA (e.g., as provided in a spec sheet) is 50 Hz meaning that the expected one full cycle of the voltage waveform is 20 milliseconds (ms) long and expected half cycle is 10 ms. Also assume that the drive portion is 70% of the expected half cycle and the high Z portion is 30% of the half cycle. Then for one-half cycle (i.e., 10 ms), the haptic driver applies the positive portion of the waveform across the LRA for 7 ms and is in the high impedance state for 3 ms.

The high impedance (high Z) state is characterized by turning off all four transistors, i.e., transistors M1, M2, M3, M4 are all disabled. Theoretically, if all transistors are disabled, then no voltage is being applied since connections to Vdd and Vss are disabled. However, the mass of the LRA—i.e., the permanent magnet—continues to move through the coil due to its mechanical momentum. This movement through the coil generates the BEMF, which is monitored to determine when it changes polarity, i.e., when it crosses the zero line. The time between "zero start" of the applied LRA voltage and "zero cross" of the BEMF is representative of the half cycle of the resonant frequency of the mechanical system of the LRA. Alternatively, time between successive zero crosses of the BEMF may be representative of the half cycle. Thus, the BEMF can be used to determine or update the resonant frequency.

The updated resonant frequency can be used for further driving and monitoring. For example, the updated resonant frequency can be used to update the length of the next half cycle. Then the haptic driver applies the negative part of the waveform for 70% of the updated half cycle, and then enters the high impedance state for remaining 30% of the updated half cycle. During the high Z portion of the updated half cycle, the BEMF can be monitored to further update the resonant frequency. The operations of applying the voltage waveform and monitoring the BEMF to revise the resonant frequency can take place continuously.

The driving and monitoring can also take place during when the mass is being decelerated. In FIG. 2, it may be assumed that the last two half cycles represent the haptic driver driving the LRA to oppose the motion of the LRA mass. That is, voltage across the LRA coil is applied a portion of the half cycle, this time to oppose the motion of the LRA mass. The haptic driver then enters the high impedance state for the remainder of the half cycle during which the BEMF is observed.

Figure 3A:
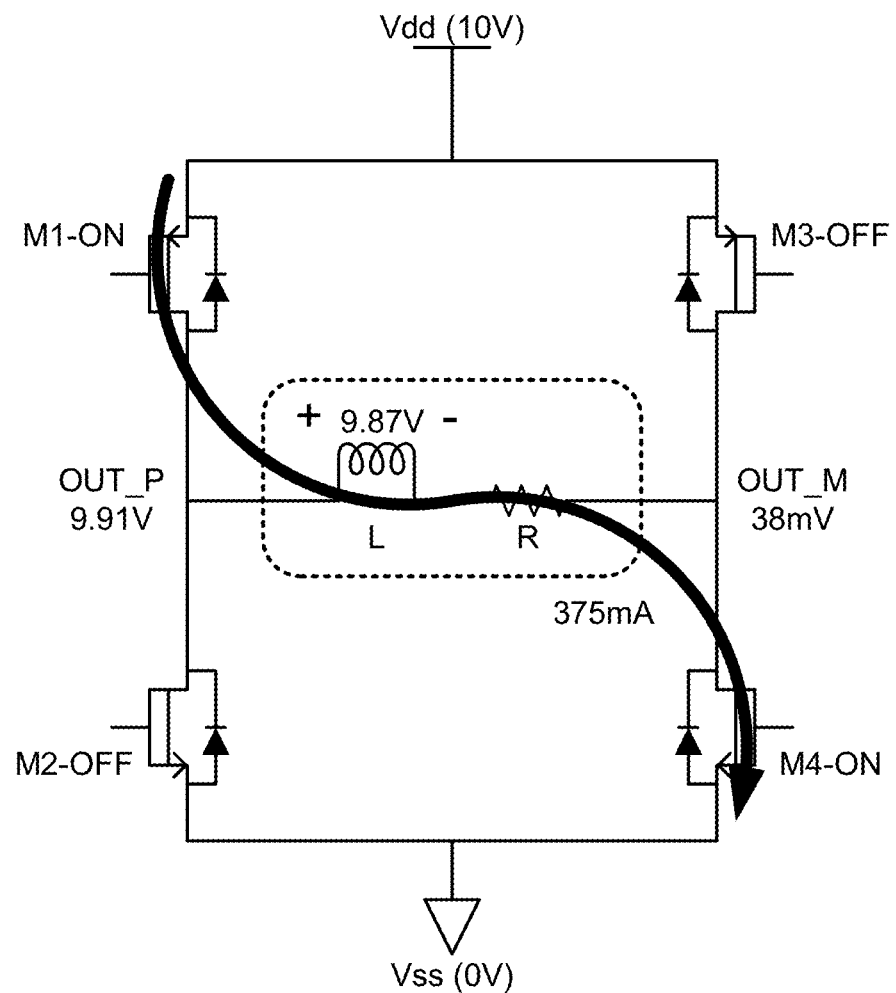
FIG. 3A illustrates a state of a haptic driver and a linear resonant actuator just prior to entering a high impedance state.
Figure 3B:
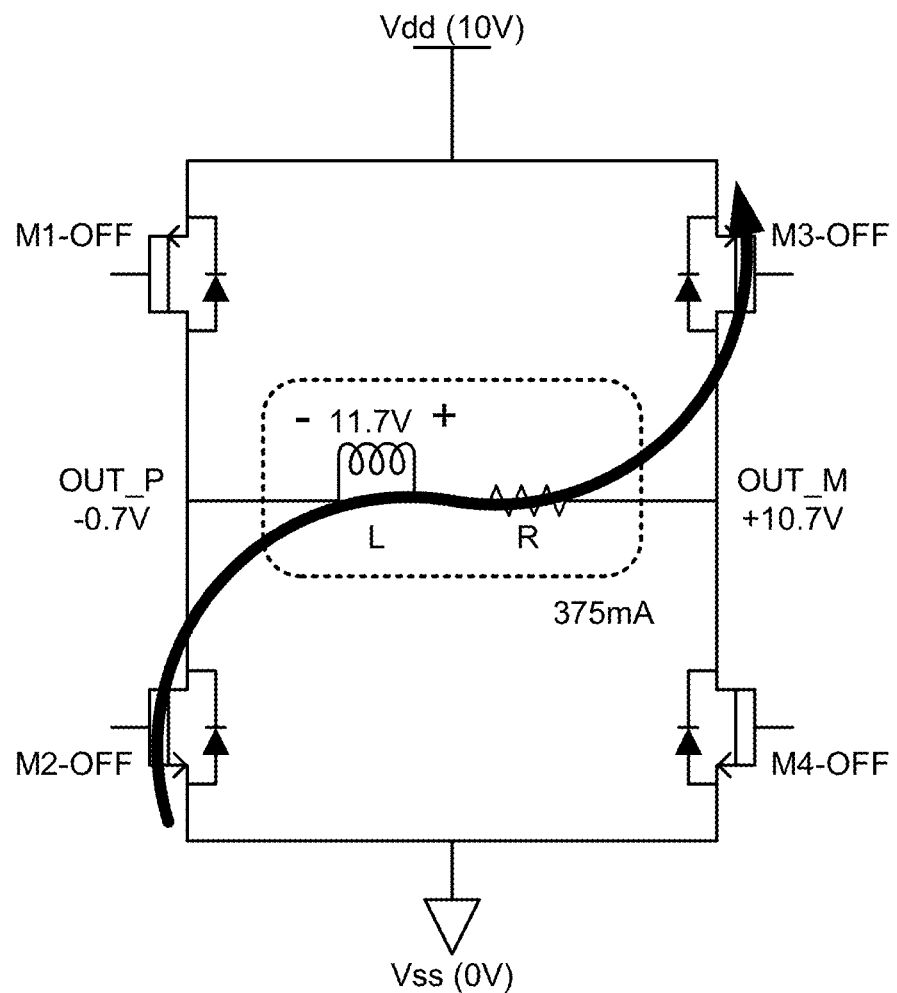
FIG. 3B illustrates a state of an example haptic driver and the linear resonant actuator immediately after entering the high impedance state.

As indicated, for auto-resonant frequency drive, the haptic driver applies a waveform voltage across the LRA coil for the drive portion of the half cycle and then enters the high impedance state for the remaining high Z portion to monitor the BEMF. FIGS. 3A and 3B are used to explain how audible noise is generated when the haptic driver enters the high impedance state. FIG. 3A illustrates a state of the haptic driver and LRA circuit at the end of the drive portion (just before entering the high impedance state), and FIG. 3B illustrates a state of the same circuit at the beginning of the high-Z portion (just after entering the high impedance state).

In FIG. 3A, it is assumed that prior to entering the high impedance state, the transistors M1, M4 are modulated so that the voltage across the LRA is about 30-40% of peak amplitude of the sinusoidal voltage waveform. Assuming that Vdd=10V and Vss=ground, the instantaneous voltage across the LRA coil can be approximately +10V. The current flowing through the coil will be related to the time average voltage applied across the coil. With a time average differential voltage of 6V and an LRA impedance of 8Ω, an average current of 375 mA will flow through the LRA. Within the LRA coil, the current flows from the OUT_P node side to OUT_M node side. The current is supplied from the supply voltage Vdd through M1 and goes to ground through M4.

As seen in FIG. 3B, the haptic driver enters the high impedance state in which all transistors, i.e., transistors M1, M2, M3 and M4, are turned off. The current in the LRA continues to flow through the LRA coil even though the haptic driver has entered the high impedance state. The coil windings of the LRA forms an inductor, and the voltage and current relationship through an inductor can be represented as V=L di/dt. So at the moment the haptic driver goes high impedance, there is current still flowing through the inductor in the same direction (from OUT_P node side to OUT_M node side), but the voltage reverses across the LRA. This indicates that current is being pulled from ground through the body diode of transistor M2, which pulls the OUT_P node to a voltage below ground (e.g., −0.7V). The current is also pushed to the OUT_M node, which charges the voltage and continue to rise until it is clamped by the body diode of transistor M3 meaning that the voltage at OUT_M node rises above the supply voltage Vdd (e.g., +10.7V). As a result, the magnitude of the instantaneous voltage between OUT_P and OUT_M becomes greater than the supply voltage (11.7V>Vdd-Vss). Thus, significant electric field is applied through the coil, and a large braking force is applied to the mass, which causes the velocity of the mass to slow down quickly. This in turn results in undesirable audible noises being generated.

This phenomenon can be summarized as follows. When the haptic driver is abruptly disabled, the current in the LRA coil continues to flow in the same direction. If the haptic driver is in the high impedance state (all transistors disabled), the voltage across the coil quickly reverses and become limited by the drive supply voltage (e.g., Vdd-Vss) and the body diodes of the transistors. The resulting voltage resists/opposes the motion of the permanent magnet in the LRA, which causes the mass to abruptly slow (velocity reduction). This abrupt reduction in the mass velocity can cause audible noises (e.g., as the mass hits the LRA case). The velocity reduction can be detected through measuring the LRA acceleration—large dv/dt can cause spike in the acceleration.

To state it another way, large impedance can cause the mass to slow down, which is not desirable. The action of abruptly entering the high impedance state (turning the transistors off) causes the residual DC current to be rectified and discharge the energy in the coil resulting in the negative acceleration force on the mass thereby slowing it down (very quickly), which causes the audible noise. A direct correlation between audible noise and disturbances in the LRA acceleration has been observed.

Before proceeding further, the following is noted. In the discussion below, LRA may be used as an example of a haptic actuator. However, it should be kept in mind that the discussion may be applicable to other types of haptic actuators (e.g., eccentric rotating mass (ERM), piezoelectric bender, etc.).

To address the issues with existing ways of driving haptic actuators, it is proposed to provide system(s), apparatus(es) and/or method(s) for haptic drivers to enter into the high impedance state to monitor the BEMF while minimizing or even eliminating disturbances to the mechanical motion of the actuator mass. In an aspect, in addition to drive and high Z modes, provide a transition mode—also referred to as a "ramp down" mode—to the haptic driver.

Figure 4A:
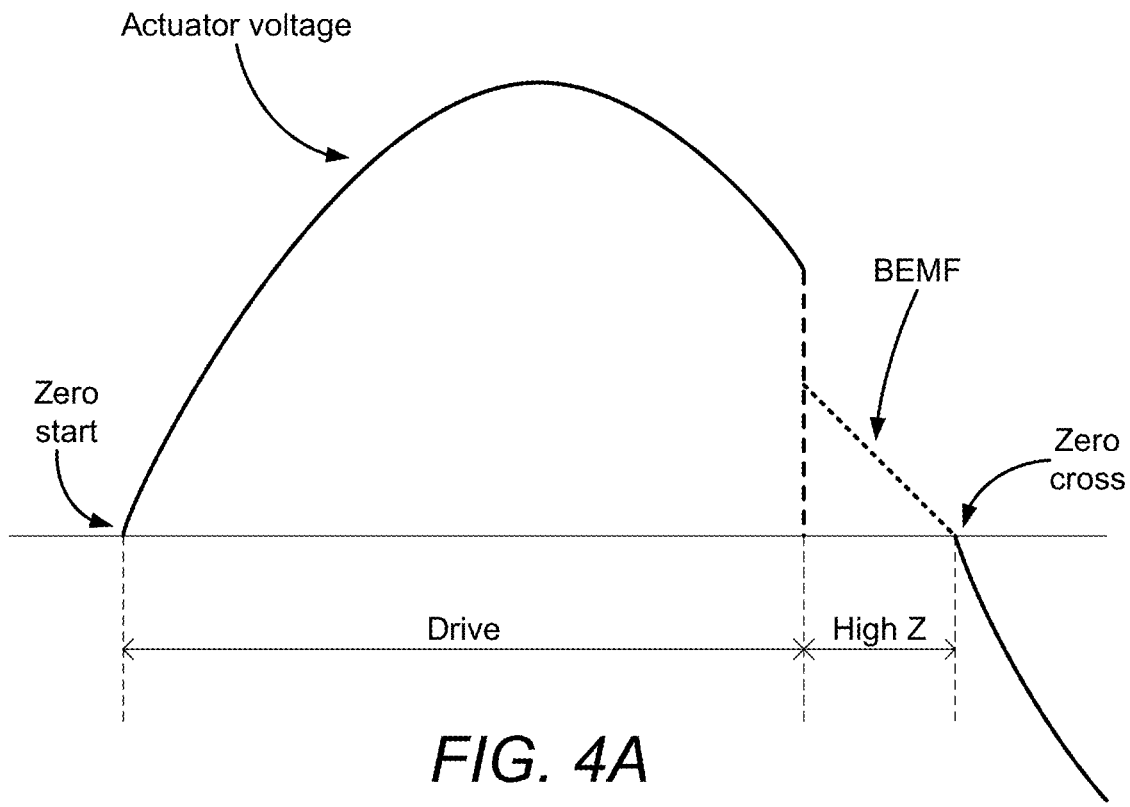
FIG. 4A illustrates a conventional implementation of voltage waveform with high impedance.
Figure 4B:
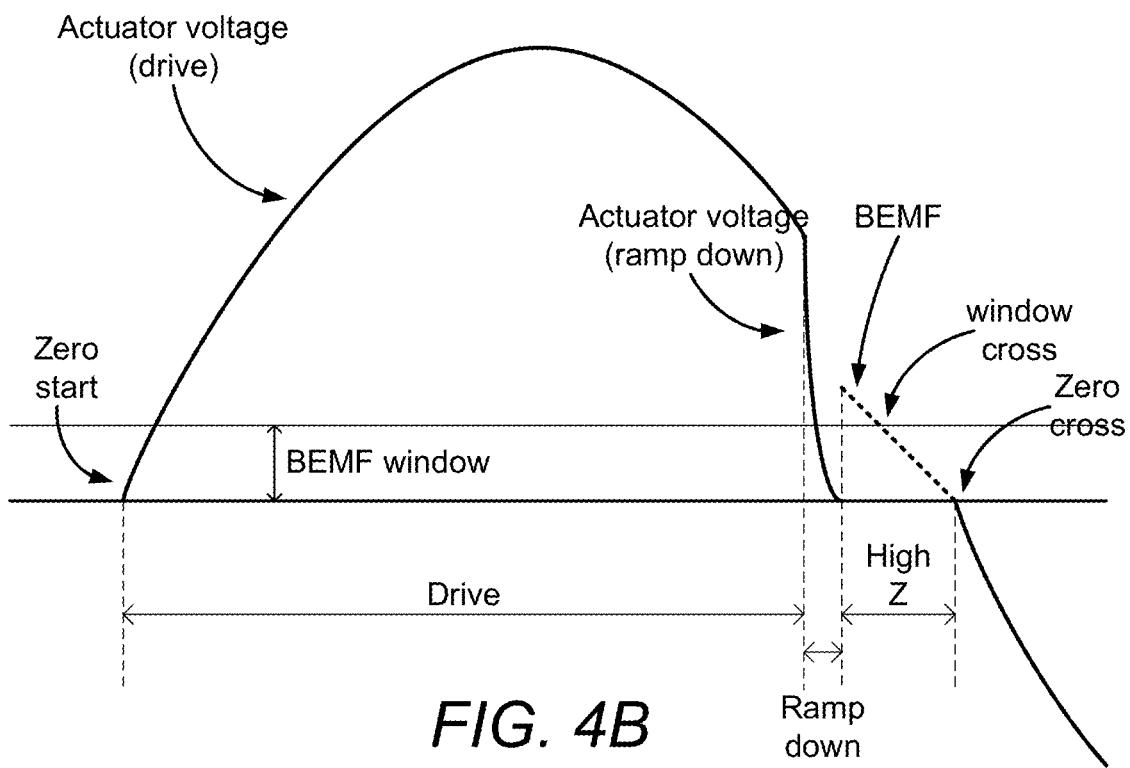
FIG. 4B illustrates an implementation of voltage waveform with ramp down in addition to high impedance in accordance with one or more aspects of the disclosure.

This is illustrated in FIGS. 4A and 4B. In FIG. 4A, the conventional implementation of drive waveform with high impedance is shown. In this conventional implementation, the haptic driver drives the actuator (e.g., LRA) so that a voltage (denoted as "actuator voltage"), in the form of a sinusoidal wave, is applied across the actuator coil during the drive portion of the half cycle. The haptic driver then abruptly enters the high impedance state and remains there during the high Z portion, which is for the remainder of the half cycle. During the high Z portion, the BEMF is observed to determine the actual half cycle, and thus determine the resonant frequency of the actuator. But as indicated, such sudden entrance into the high impedance state can cause audible noise to be generated.

One way to minimize or even eliminate the noise generation is to incorporate a "ramp down" portion in between drive and high Z portions of the half cycle. That is, a half cycle may be divided into a drive portion, a ramp down portion, and a high Z portion. This is illustrated in FIG. 4B. As before, during the drive portion, the haptic driver may be controlled to drive the haptic actuator so that a voltage waveform (denoted as "actuator voltage (drive)") is applied to the haptic actuator. The voltage waveform may be a sinusoidal waveform. As an example, the drive portion may be at least 50% of the half cycle (e.g., about 50-90%) of the half cycle. The drive portion may be followed by a ramp down portion (described below). Thereafter, for the remaining high Z portion of the half cycle, the haptic controller may control the haptic driver to enter the high impedance state in which all transistors are disabled and the BEMF is observed to determine the actual half cycle. In an aspect, the half cycle and/or cycle of the LRA may be calculated in each and every half cycle—e.g., from one zero crossing to the next zero crossing. In general, one or more zero crossings of the BEMF may be used to calculate the resonant frequency (e.g., by determining the half cycle every zero crossings, by determining the full cycle every other zero crossings, etc.).

During the ramp down portion, the haptic controller may control the haptic driver to ramp down the applied voltage (denoted as "actuator voltage (ramp down)") across the actuator coil continuously but quickly so that the current flowing through the coil quickly drops to zero, or at least to a value less than some threshold current value, before entering the high impedance state. The threshold current value may be a current value in which any opposing mechanical force due to the residual current does not cause audible noise generation, or any noise generated is less than some threshold noise level.

FIG. 4B illustrates a half cycle in which the voltage applied across during the drive portion (the actuator voltage (drive)) and during the ramp down portion (actuator voltage (ramp down)) are positive, i.e., above the zero line. While not shown, similar logic may apply for a half cycle in which the actuator voltages (drive and ramp down), i.e., below the zero line. That is, other than the polarities being reversed, the concept illustrated and described with respect to FIG. 4B may apply. Thus, the voltages and currents discussed with respect to FIG. 4B may be generalized as representing magnitudes of voltages and currents. For example, the ramp down of the actuator voltage may be generalized as ramping down the magnitude of the actuator voltage. Similarly, the BEMF that is detected may be generalized as detecting the magnitude of the BEMF voltage. Therefore, unless specifically indicated otherwise, the discussion of voltages and currents should be taken as being applicable to magnitudes of voltages and currents. Note that the BEMF and the drive voltages may not be scale. For example, the drive voltages may be several volts (e.g., up to 11 V), but the BEMF can typically be very small (e.g., less than 100 mV or as low as few mV).

As mentioned, during the ramp down portion, the haptic driver may be controlled to ramp down the applied actuator voltage as quickly as possible but in a continuous manner instead of abruptly entering the high impedance state. Thus, instead of abrupt entrance into the high Z state, a transition portion is incorporated so that the haptic driver may enter into the high Z state smoothly. During the ramp down portion, the transistors (such as M1, M2, M3, M4) may be modulated such that the ramp down voltage is applied across the actuator coil in a smooth fashion. The actuator voltage during the ramp down may be brought to some minimum threshold voltage such as zero. In some instances, the minimum threshold voltage may be even below zero (i.e., change polarity).

One way to visualize the difference between the voltage curves of the drive portion and the ramp down portion may be as follows. In the drive portion, the voltage curve may generally follow a sinusoidal wave curve. However, during the ramp down portion, the voltage curve may be more steep than the sinusoidal wave—at least at the beginning of the ramp down portion relative to the end of the drive portion. That is, the magnitude of dv/dt at the beginning of ramp down portion may be greater than the magnitude of dv/dt at the end of drive portion.

Figure 5A:
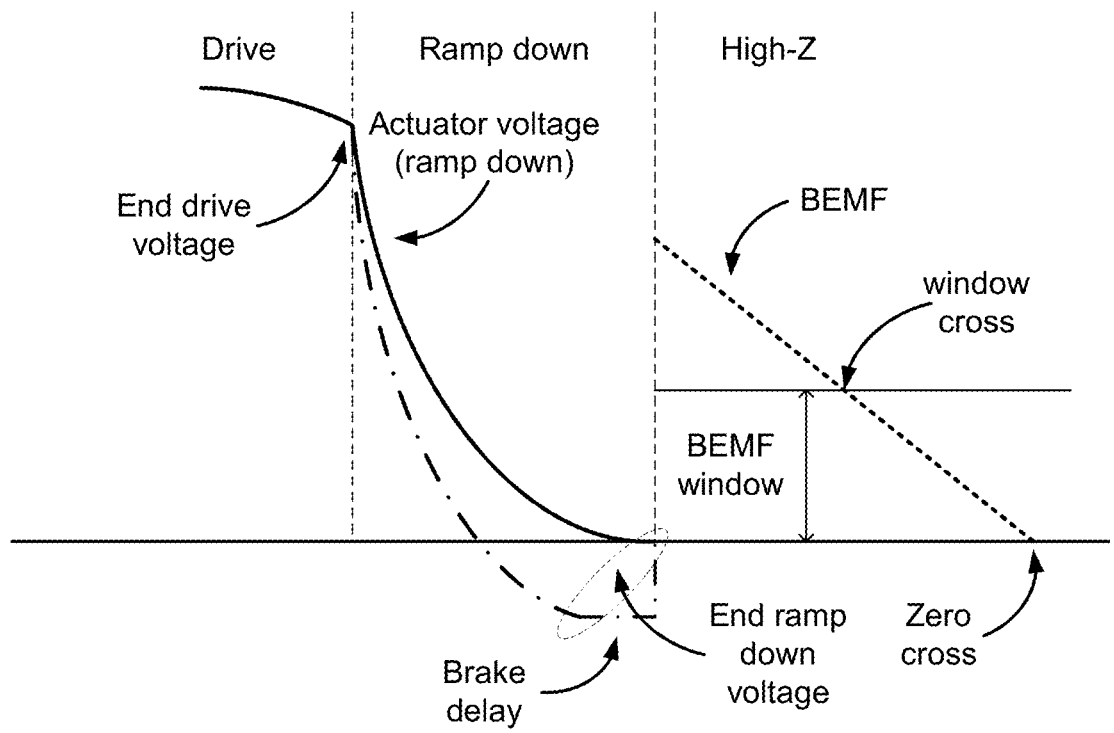
FIGS. 5A and 5B illustrate more detailed views of implementations of voltage waveforms in accordance with one or more aspects of the disclosure.
Figure 5B:
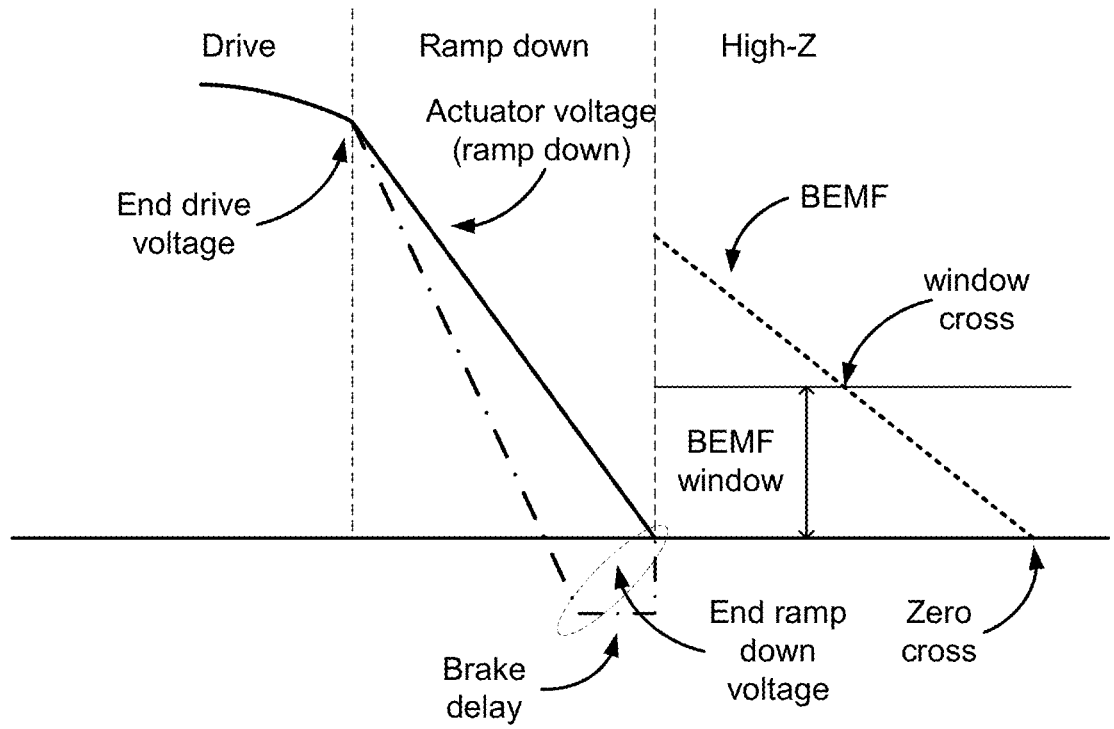

FIGS. 5A and 5B illustrate examples of shapes of voltage ramp down. Before proceeding further, the BEMF is illustrated as being linear. This is done for simplicity of explanation. Typically, the BEMF is non-linear depending on the characteristics of the LRA (e.g., displacement, coil area, etc.). However, the discussed concepts such as the window cross and zero cross still apply.

In FIGS. 5A and 5B, the views of the ramp down portion are enlarged to better illustrate the shapes of voltage curves during this portion. The voltage of the voltage waveform at the end of the drive portion is labelled as end drive voltage. During the ramp down portion, the voltage of the voltage waveform may ramp down from the end drive voltage to an end ramp down voltage. In one aspect, the ramp down of the actuator voltage may be exponential—very quickly at the beginning of the ramp down portion and approaching the end ramp down voltage (e.g., zero) softly at the end of the ramp down portion—as illustrated in FIG. 5A. In another aspect, the ramp down may be linear to the minimum threshold voltage at the end of the ramp down portion—as illustrated in FIG. 5B with solid line curve.

Alternatively, for one or both of the exponential and linear ramp down, the applied voltage across the actuator can be programed to reverse direction (act as brake) to quickly reduce actuator current. That is, the polarity of the end ramp down voltage may be opposite of the polarity of the end drive voltage. These alternatives are shown in FIGS. 5A and 5B in which the alternative actuator voltages are shown as dot-dash line curves. In an aspect, within the ramp down portion, a delay, referred to as "brake delay", may be added between the completion of the actuator voltage ramp down and the beginning of high impedance portion. That is, the voltage may reach the end ramp down voltage and then remain there for the brake delay. It should be noted that the brake delay may be implemented when the end ramp down voltage is zero.

In an aspect, the ramp down may be achieved by changing the duty cycle (e.g., of 600 kHz) of the PWM so that the average voltage—the actuator voltage—reduces to some voltage level (e.g., end ramp down voltage) and the average current—the current flowing in the actuator—also reduces to some current level (e.g., zero). That is, by ramping down the voltage during ramp down portion, the residual current flowing through the coil can drop significantly, e.g., even down to zero. As a result, when the haptic driver enters the high impedance state, the noise generated can be reduced significantly or even eliminated altogether.

The duration of the ramp down portion may depend on one or more considerations or factors. The following are some (not necessarily exhaustive) of the considerations that may factor into determining the duration of the ramp down portion—energy input to actuator, smooth/continuous ramp down completion, and BEMF window. Regarding energy input to actuator, it is generally desirable to maximize the energy input to the actuator to enhance performance. This means that the drive portion should be as long as possible, which in turn means that the ramp down portion should be as short as possible.

Regarding smooth/continuous ramp down completion, the inductance of the actuator may limit how fast the voltage across the actuator may change. That is, there may be a max(dv/dt), and the speed of the ramp down should be in consideration of this max(dv/dt). In short, the ramp down portion should be long enough to complete the ramp down of the applied voltage to the desired minimum threshold voltage (e.g., to zero, to change polarity plus brake delay, etc.). A longer ramp down portion may allow the ramp down voltage curve to be smoother.

Regarding the BEMF, in one aspect, it may be desirable to ascertain an amount of energy currently present in the actuator. For example, when the vibration of the actuator is to be stopped, the energy information may be used to determine the amount of braking force and the amount of time for braking may be determined. The BEMF window may be used determine the amount of energy present in the actuator. In FIGS. 4B, 5A and 5B, a BEMF window is defined as a voltage region between zero and some voltage level above zero. Since the BEMF window shown in these figures are magnitudes, the actual BEMF window can be a region above and below the zero line. The time between when the BEMF crosses the BEMF window (labeled as "window cross") and zero cross may be used to quantify the amount of energy that exists in the actuator.

If the BEMF window is utilized, then the high Z portion should be long enough so that the BEMF is outside the BEMF window when the haptic driver enters the high Z state. This may determine a minimum duration of the high-Z portion, which in turn may correspondingly impact the lengths of drive portion and/or the ramp down portion.

Note that the BEMF window is not necessary if energy of the actuator need not be determined or if there are alternative ways to determine the energy. In such instances, the zero cross may be detected to determine the half cycle. The BEMF window cross need not be implemented. Thus, the high Z portion can be relatively short meaning that the drive portion and/or the ramp down portion can be made longer.

In consideration of one or more of such factors, the duration of the ramp down portion may generally range between 10 µs-100 µs. However, depending on the circumstances, the ramp down portion may be outside of the general range (e.g., shorter than 10 µs or longer than 100 µs).

Figure 6:
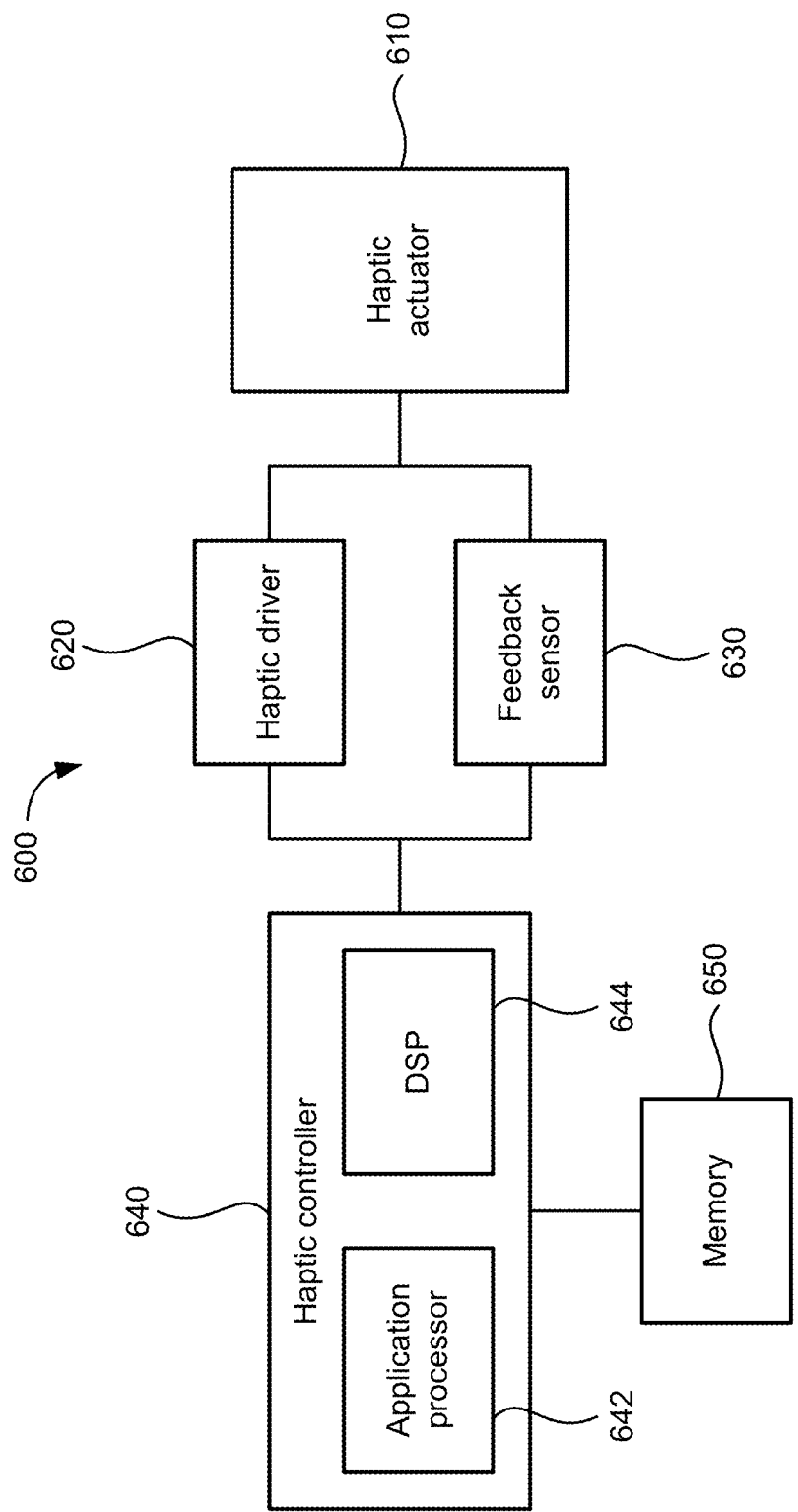
FIG. 6 illustrates an example architecture of a device or system configured to generate voltage waveforms in accordance with one or more aspects of the disclosure.

FIG. 6 illustrates an example architecture of an apparatus or system 600 configured to generate haptic waveform in accordance with at one or more aspects of the disclosure. The apparatus 600 may be a mobile device, such as a smart phone. As seen, the apparatus 300 may include a haptics actuator 610, a haptic driver 620, a feedback sensor 630, a haptic controller 640, and a memory 650.

The haptic actuator 610 may be a two-terminal device driven by differential analog drive signals outputted by the haptic driver 620. The drive signals may be used to drive the haptic actuator 610. The haptic actuator 610 (e.g., LRA, ERM, piezoelectric bender, etc.) may be configured to vibrate based on drive signals from the haptic controller 640.

The haptic driver 620 may be configured to generate the drive signals, i.e., generate the voltage waveform, based on control signals received from the haptic controller 640 and provide the drive signals to the haptic actuator 610.

The feedback sensor 630 may be configured conduct one or more feedback (e.g., BEMF) measurements and provide feedback to the haptic controller 640. The feedback may information regarding the measurement such as the sensed BEMF. For example, the feedback may include voltage levels of the sensed BEMF. Alternatively, or in addition thereto, the feedback may include zero crossing and/or window crossing indications and/or crossings of any other threshold voltage levels of the BEMF.

The haptic controller 640 may comprise an application processor 642 and a digital signal processor (DSP) 644. The DSP 644 may be configured to configured to track and update parameters of the haptic actuator including resonant frequency, cycle length, half cycle length, etc. based on feedback from the haptic driver 620. The DSP 644 may also be configured to calculate or otherwise determine the zero crossing and/or window crossing and/or crossings of any other threshold voltage levels of the BEMF based on the BEMF voltage levels included in the feedback and/or receive such information when they are included in the feedback.

The application processor 642 may be configured to calculate or otherwise the determine the drive portion, the ramp down portion, and the high Z portion of each half cycle (as updated by the DSP 644). The application processor 642 may also be configured to calculate or otherwise compose the voltage waveform to be applied to the haptic actuator 610 by the haptic driver 620 during the drive and ramp down portions of the half cycle. The application processor 642 and/or the DSP 644 may be configured to provide the control signals in accordance with the drive portion, the ramp down portion, the high Z portion, and the voltage waveform to the haptic driver 620.

Each of the haptic driver 620, the feedback sensor 630 and the haptic controller 640 (including one or both of the application processor 642 and the DSP 644) may be implemented as hardware or as a combination of hardware and software (e.g., stored in memory 650). In an aspect, the application processor 642 and/or the DSP 644 may be realized in a single integrated circuit (IC) such as in an integrated mobile device processor. Alternatively, the DSP 644 and the memory 650 (e.g., an embedded memory) and the haptic driver 620 may be integrated into one IC, while the application processor 642 may be separate and interface with the memory 650.

Figure 7:
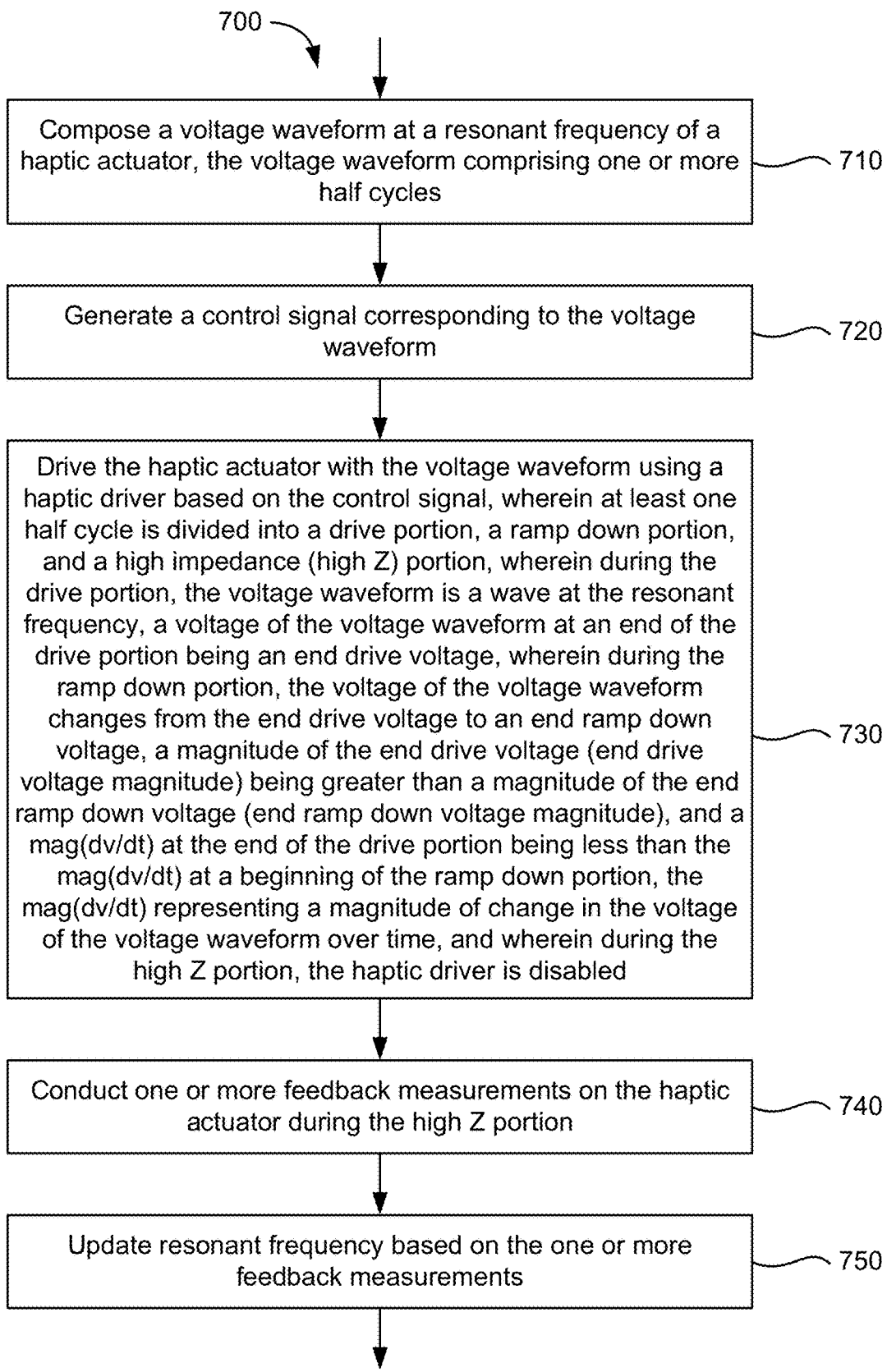
FIG. 7 illustrates a flow chart of an example method of generating haptic waveform in accordance with at one or more aspects of the disclosure.

FIG. 7 illustrates a flow chart of an example method 700 of generating voltage waveform for a haptic actuator in accordance with at one or more aspects of the disclosure. The illustrated method 700 may be performed by any of the device and/or system 600 described above. In an aspect, the memory 650 may be an example of a non-transitory computer readable medium storing executable instructions for the system and/or device to perform the method 700.

In block 710, the device may compose a voltage waveform at a resonant frequency of a haptic actuator. The voltage waveform may comprise one or more half cycles. At least one-half cycle may be divided into a drive portion, a ramp down portion, and a high impedance (high Z) portion. During the drive portion, the voltage waveform may be a wave at the resonant frequency. The voltage of the voltage waveform at an end of the drive portion may be referred to as an end drive voltage. During the ramp down portion, the voltage of the voltage waveform may change from the end drive voltage to an end ramp down voltage. A magnitude of the end drive voltage (end drive voltage magnitude) may be greater than a magnitude of the end ramp down voltage (end ramp down voltage magnitude). A mag(dv/dt) at the end of the drive portion may be less than the mag(dv/dt) at a beginning of the ramp down portion. The mag(dv/dt) may represent a magnitude of change in the voltage of the voltage waveform over time. During the high Z portion, the haptic driver 620 may be disabled. In an aspect, an application processor (e.g., application processor 642) and/or a DSP (e.g., DSP 644) may be configured to perform block 710.

In block 720, the device may device may generate a control signal corresponding to the voltage wave form. In an aspect, an application processor (e.g., application processor 642) and/or a DSP (e.g., DSP 644) may be configured to perform block 720.

In block 730, the device may drive the haptic controller with the voltage waveform based on the control signal. In an aspect, a haptic driver (e.g., haptic driver 620) may be configured to perform block 730.

In block 740, the device may conduct one or more feedback measurements on the haptic actuator 610 during the high Z portion. In an aspect, a feedback sensor (e.g., feedback sensor 630) may be configured to block 740. An example of the feedback sensor may be a BEMF sensor configured to conduct one or more measurements of the BEMF induced in the haptic actuator 610 during the high Z portion.

In block 750, the device may update the resonant frequency of the haptic actuator 610 based on the one or more feedback measurements. For example, if the feedback measurements are BEMF measurements, then the device may update the frequency of the haptic actuator based on the zero start (i.e., start of the drive portion where the voltage of the voltage waveform is zero volts) and the zero cross (i.e., voltage at an end of the high Z portion where the BEMF crosses zero volts). In an aspect, an application processor (e.g., application processor 642) and/or a DSP (e.g., DSP 644) may be configured to perform block 750.

As mentioned above, the haptic controller 640 (application processor 642 and/or DSP 644) may be configured to determine an amount of energy present in the haptic actuator 610 based on the one or more BEMF measurements. The energy determination may be used to generate a voltage waveform to decelerate the haptic actuator 610.

It should be noted that not all illustrated blocks of FIG. 7 need to be performed, i.e., some blocks may be optional. Also, the numerical references to the blocks in FIG. 7 should not be taken as requiring that the blocks should be performed in a certain order unless specifically indicated otherwise. Indeed, some blocks may be performed concurrently.

Figure 8:
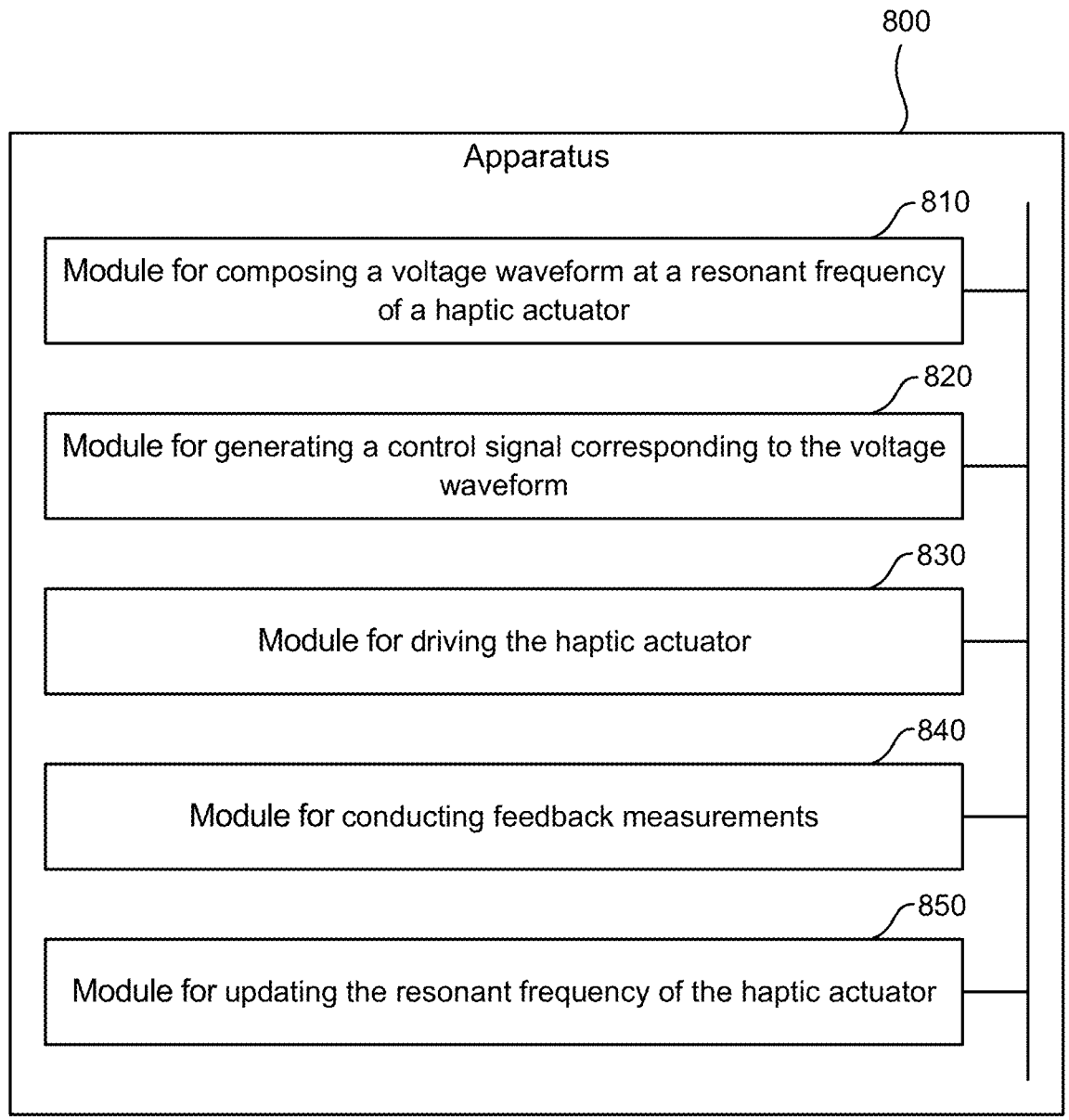
FIG. 8 illustrates a simplified block diagram of several sample aspects of a device configured to generate haptic waveform in accordance with one or more aspects of the disclosure.

FIG. 8 illustrates an example device 800 represented as a series of interrelated functional modules connected by a common bus. Each of the modules may be implemented in hardware or as a combination of hardware and software. For example, the modules may perform the method 700 of FIG. 7 and may be implemented as any combination of the modules of the system/device 600 of FIG. 6. A module for composing a voltage waveform 810 at a resonant frequency of a haptic actuator may correspond at least in some aspects to an applications processor (e.g., applications processor 642), a DSP (e.g., DSP 644), and/or a memory (e.g., memory 650). A module for generating a control signal corresponding to the voltage waveform 820 may correspond at least in some aspects to to an applications processor (e.g., applications processor 642), a DSP (e.g., DSP 644), and/or a memory (e.g., memory 650). A module for driving a haptic actuator 830 may correspond at least in some aspects to a haptic driver (e.g., haptic driver 620), and/or a memory (e.g., memory 650). A module for conducting feedback measurements 840 may correspond at least in some aspects to a feedback sensor (e.g., feedback sensor 630) and/or a memory (e.g., memory 650). A module for updating the resonant frequency of the haptic actuator 850 may correspond at least in some aspects an applications processor (e.g., applications processor 642), a DSP (e.g., DSP 644), and/or a memory (e.g., memory 650).

Figure 9:
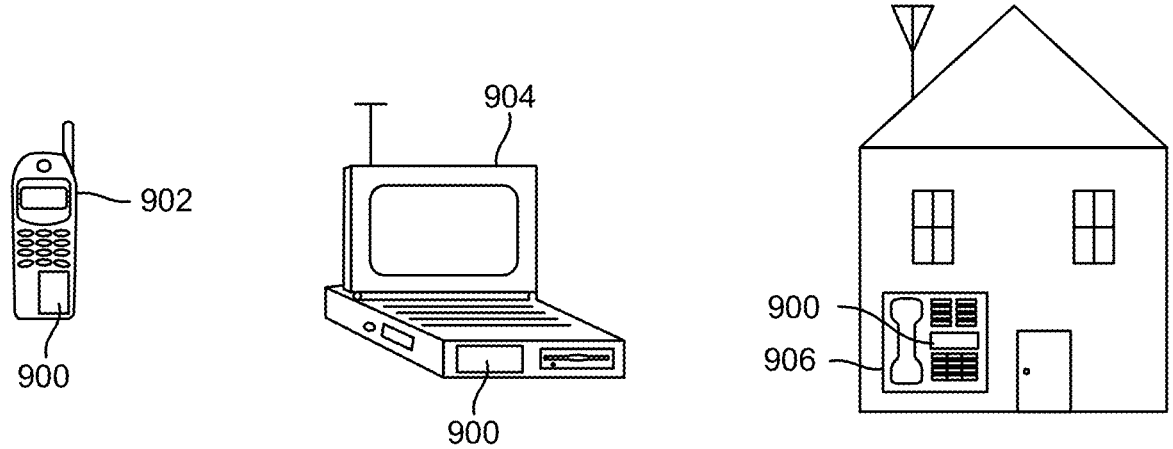
FIG. 9 illustrates various electronic devices which may utilize one or more aspects of the disclosure.

FIG. 9 illustrates various electronic devices that may be integrated with any of the aforementioned systems/devices in accordance with various aspects of the disclosure. For example, a mobile phone device 902, a laptop computer device 904, and a terminal device 906 may include the haptics waveform generation system/device 900. The devices 902, 904, 906 illustrated in FIG. 9 are merely exemplary. Other electronic devices may also include, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof.

Implementation examples are described in the following numbered clauses:

Clause 1: A device, comprising: a haptic controller configured to compose a voltage waveform at a resonant frequency of a haptic actuator, and configured to generate a control signal corresponding to the voltage waveform, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time; and a haptic driver configured to drive the haptic actuator with the voltage waveform based on the control signal, and is configured to be disabled during the high Z portion.

Clause 2: The device of clause 1, wherein the haptic actuator is a linear resonant actuator.

Clause 3: The device of any of clauses 1-2, wherein the voltage waveform is a sinusoidal wave during the drive portion.

Clause 4: The device of any of clauses 1-3, wherein during the ramp down portion, a magnitude of the voltage of the voltage waveform ramps down exponentially from the end drive voltage magnitude to the end ramp down voltage magnitude.

Clause 5: The device of any of clauses 1-4, wherein during the ramp down portion, a magnitude of the voltage of the voltage waveform ramps down linearly from the end drive voltage magnitude to the end ramp down voltage magnitude.

Clause 6: The device of any of clauses 1-5, wherein the end ramp down voltage is zero.

Clause 7: The device of any of clauses 1-5, wherein a polarity of the end ramp down voltage is opposite to a polarity of the end drive voltage.

Clause 8: The device of any of clauses 1-7, wherein the ramp down portion includes a brake delay at an end part of the ramp down portion, an end of the brake delay being an end of the ramp down portion, and wherein the voltage of the voltage waveform reaches the end ramp down voltage by a beginning of the brake delay and remains at the end ramp down voltage during the brake delay.

Clause 9: The device of any of clauses 1-8, a feedback sensor configured to conduct one or more feedback measurements on the haptic actuator during the high Z portion, wherein the haptic controller is configured to update the resonant frequency of the haptic actuator based on the one or more feedback measurements.

Clause 10: The device of clause 9, wherein the feedback sensor is a back electromotive force (BEMF) sensor configured to conduct one or more measurements on the BEMF induced in the haptic actuator, and wherein the haptic controller is configured to update the resonant frequency based on a zero start and a zero cross, the zero start being a start of the drive portion where the voltage of the voltage waveform is zero volts and the zero cross being an end of the high Z portion where the BEMF crosses zero volts.

Clause 11: The device of clause 10, wherein the haptic controller is configured to determine an amount of energy present in the haptic actuator based on the one or more BEMF measurements.

Clause 12: The device of any of clauses 9-11, wherein for one or more future half cycles, the haptic controller is configured to compose the voltage waveform at the updated resonant frequency.

Clause 13: The device of any of clauses 1-12, wherein the drive portion is at least 50% of the half cycle.

Clause 14: The device of clause any of clauses 1-13, a range of the ramp down portion is substantially 10 μs-100 μs.

Clause 15: The device of any of clauses 1-14, wherein the device is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

Clause 16: A method comprising: composing a voltage waveform at a resonant frequency of a haptic actuator, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time; generating a control signal corresponding to the voltage waveform; and driving the haptic actuator with the voltage waveform using a haptic driver based on the control signal, wherein during the high Z portion, the haptic driver is disabled.

Clause 17: The method of clause 16, wherein the haptic actuator is a linear resonant actuator.

Clause 18: The method of any of clauses 16-17, wherein the voltage waveform is a sinusoidal wave during the drive portion.

Clause 19: The method of any of clauses 16-18, wherein during the ramp down portion, a magnitude of the voltage of the voltage waveform ramps down exponentially from the end drive voltage magnitude to the end ramp down voltage magnitude.

Clause 20: The method of any of clauses 16-19, wherein during the ramp down portion, a magnitude of the voltage of the voltage waveform ramps down linearly from the end drive voltage magnitude to the end ramp down voltage magnitude.

Clause 21: The method of any of clauses 16-20, wherein the end ramp down voltage is zero.

Clause 22: The method of any of clauses 16-20, wherein a polarity of the end ramp down voltage is opposite to a polarity of the end drive voltage.

Clause 23: The method of any of clauses 16-22, wherein the ramp down portion includes a brake delay at an end part of the ramp down portion, an end of the brake delay being and end of the ramp down portion, and wherein the voltage of the voltage waveform reaches the end ramp down voltage by a beginning of the brake delay and remains at the end ramp down voltage during the brake delay.

Clause 24: The method of any of clauses 16-23, conducting one or more feedback measurements on the haptic actuator during the high Z portion, and updating the resonant frequency of the haptic actuator based on the one or more feedback measurements.

Clause 25: The method of clause 24, wherein conducting the one or more feedback measurements comprises conducting one or more measurements of a back electromotive force (BEMF) induced in the haptic actuator, and wherein updating the resonant frequency comprises updating the resonant frequency of the haptic actuator based on a zero start and a zero cross, the zero start being a start of the drive portion where the voltage of the voltage waveform is zero volts and the zero cross being an end of the high Z portion where the BEMF crosses zero volts.

Clause 26: The method of clause 25, further comprising determining an amount of energy present in the haptic actuator based on the one or more BEMF measurements.

Clause 27: The method of any of clauses 24-26, wherein for one or more future half cycles, the voltage waveform is composed at the updated resonant frequency.

Clause 28: The method of any of clauses 16-27, wherein the drive portion is at least 50% of the half cycle.

Clause 29: The method of clause any of clauses 16-28, wherein a range of the ramp down portion is substantially 1-100 μs.

Clause 30: A device comprising at least one means for performing a method of any of Clauses 16-29.

Clause 31: A device comprising a memory and a processor communicatively connected to the memory, the processor being configured perform a method of any of Clauses 16-29.

Clause 32: A non-transitory computer-readable medium storing code for a device comprising a memory and a processor communicatively connected to the memory, and instructions stored in the memory and executable by the processor to cause the device to perform a method of any of Clauses 16-29.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

It should be noted that the terms "connected," "coupled," or any variant thereof, mean any connection or coupling, either direct or indirect, between elements, and can encompass a presence of an intermediate element between two elements that are "connected" or "coupled" together via the intermediate element unless the connection is expressly disclosed as being directly connected.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or one or more claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A device comprising:
a haptic controller configured to compose a voltage waveform at a resonant frequency of a haptic actuator, and configured to generate a control signal corresponding to the voltage waveform, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time; and a haptic driver configured to drive the haptic actuator with the voltage waveform based on the control signal, and is configured to be disabled during the high Z portion.

2. The device of claim 1, wherein the haptic actuator is a linear resonant actuator.

3. The device of claim 1, wherein the voltage waveform is a sinusoidal wave during the drive portion.

4. The device of claim 1, wherein during the ramp down portion, a magnitude of the voltage of the voltage waveform ramps down exponentially from the end drive voltage magnitude to the end ramp down voltage magnitude.

5. The device of claim 1, wherein during the ramp down portion, a magnitude of the voltage of the voltage waveform ramps down linearly from the end drive voltage magnitude to the end ramp down voltage magnitude.

6. The device of claim 1, wherein the end ramp down voltage is zero.

7. The device of claim 1, wherein a polarity of the end ramp down voltage is opposite to a polarity of the end drive voltage.

8. The device of claim 1,
wherein the ramp down portion includes a brake delay at an end part of the ramp down portion, an end of the brake delay being an end of the ramp down portion, and
wherein the voltage of the voltage waveform reaches the end ramp down voltage by a beginning of the brake delay and remains at the end ramp down voltage during the brake delay.

9. The device of claim 1, further comprising:
a feedback sensor configured to conduct one or more feedback measurements on the haptic actuator during the high Z portion,
wherein the haptic controller is configured to update the resonant frequency of the haptic actuator based on the one or more feedback measurements.

10. The device of claim 9,
wherein the feedback sensor is a back electromotive force (BEMF) sensor configured to conduct one or more measurements on the BEMF induced in the haptic actuator, and
wherein the haptic controller is configured to update the resonant frequency based on one or more zero crossings, each zero crossing being an end of the high Z portion where the BEMF crosses zero volts.

11. The device of claim 10, wherein the haptic controller is configured to determine an amount of energy present in the haptic actuator based on the one or more BEMF measurements.

12. The device of claim 9, wherein for one or more future half cycles, the haptic controller is configured to compose the voltage waveform at the updated resonant frequency.

13. The device of claim 1, wherein the drive portion is at least 50% of the half cycle.

14. The device of claim 1, wherein a range of the ramp down portion is substantially 10 µs-100 µs.

15. The device of claim 1, wherein the device is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

16. A method comprising:
composing a voltage waveform at a resonant frequency of a haptic actuator, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time;
generating a control signal corresponding to the voltage waveform; and
driving the haptic actuator with the voltage waveform using a haptic driver based on the control signal, wherein during the high Z portion, the haptic driver is disabled.

17. The method of claim 16, wherein the haptic actuator is a linear resonant actuator.

18. The method of claim 16, wherein the voltage waveform is a sinusoidal wave during the drive portion.

19. The method of claim 16, wherein during the ramp down portion, a magnitude of the voltage of the voltage waveform ramps down exponentially from the end drive voltage magnitude to the end ramp down voltage magnitude.

20. The method of claim 16, wherein during the ramp down portion, a magnitude of the voltage of the voltage waveform ramps down linearly from the end drive voltage magnitude to the end ramp down voltage magnitude.

21. The method of claim 16, wherein the end ramp down voltage is zero.

22. The method of claim 16, wherein a polarity of the end ramp down voltage is opposite to a polarity of the end drive voltage.

23. The method of claim 16,
wherein the ramp down portion includes a brake delay at an end part of the ramp down portion, an end of the brake delay being and end of the ramp down portion, and
wherein the voltage of the voltage waveform reaches the end ramp down voltage by a beginning of the brake delay and remains at the end ramp down voltage during the brake delay.

24. The method of claim 16, further comprising:
conducting one or more feedback measurements on the haptic actuator during the high Z portion, and
updating the resonant frequency of the haptic actuator based on the one or more feedback measurements.

25. The method of claim 24,
wherein conducting the one or more feedback measurements comprises conducting one or more measurements of a back electromotive force (BEMF) induced in the haptic actuator, and
wherein updating the resonant frequency comprises updating the resonant frequency of the haptic actuator based on one or more zero crossings, each zero crossing being an end of the high Z portion where the BEMF crosses zero volts.

26. The method of claim 24, wherein for one or more future half cycles, the voltage waveform is composed at the updated resonant frequency.

27. The method of claim 16, wherein the drive portion is at least 50% of the half cycle.

28. The method of claim 16, wherein a range of the ramp down portion is substantially 10 μs-100 μs.

29. A device, comprising:
means for composing a voltage waveform at a resonant frequency of a haptic actuator, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time;
means for generating a control signal corresponding to the voltage waveform; and
means for driving the haptic actuator with the voltage waveform based on the control signal, wherein during the high Z portion, the means for driving is disabled.

30. A non-transitory computer-readable medium storing computer-executable instructions for a device, the computer-executable instructions comprising:
one or more instructions to instruct the device to compose a voltage waveform at a resonant frequency of a haptic actuator, wherein the voltage waveform comprises at least one half cycle divided into a drive portion, a ramp down portion, and a high impedance (high Z) portion, wherein during the drive portion, the voltage waveform is a wave at the resonant frequency, a voltage of the voltage waveform at an end of the drive portion being an end drive voltage, and wherein during the ramp down portion, the voltage of the voltage waveform changes from the end drive voltage to an end ramp down voltage, a magnitude of the end drive voltage (end drive voltage magnitude) being greater than a magnitude of the end ramp down voltage (end ramp down voltage magnitude), and a mag(dv/dt) at the end of the drive portion being less than the mag(dv/dt) at a beginning of the ramp down portion, the mag(dv/dt) representing a magnitude of change in the voltage of the voltage waveform over time;
one or more instructions to instruct the device to generate a control signal corresponding to the voltage waveform; and
one or more instructions to instruct the device to drive the haptic actuator with the voltage waveform using a haptic driver based on the control signal, wherein during the high Z portion, the haptic driver is disabled.

* * * * *